(12) United States Patent
Kasza et al.

(10) Patent No.: US 8,437,118 B2
(45) Date of Patent: May 7, 2013

(54) POWER SWITCHGEAR

(75) Inventors: Krzysztof Kasza, Krakow (PL); Lukasz Malinowski, Krakow (PL); Robert Sekula, Krakow (PL)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 13/383,423

(22) PCT Filed: Jul. 8, 2010

(86) PCT No.: PCT/EP2010/004402
§ 371 (c)(1),
(2), (4) Date: Jan. 11, 2012

(87) PCT Pub. No.: WO2011/012237
PCT Pub. Date: Feb. 3, 2011

(65) Prior Publication Data
US 2012/0106033 A1 May 3, 2012

(30) Foreign Application Priority Data
Jul. 27, 2009 (EP) .................................... 09460033

(51) Int. Cl.
*H05K 7/20* (2006.01)
*H05K 13/00* (2006.01)
*H02B 5/00* (2006.01)
*H02B 1/56* (2006.01)

(52) U.S. Cl.
USPC ........... 361/605; 361/611; 361/637; 361/648; 361/679.54; 361/704; 361/709; 361/713; 174/16.2; 174/70 B; 174/71 B; 174/72 B; 174/88 B; 174/99 B; 174/133 B

(58) Field of Classification Search ................... 361/600, 361/605, 611, 634, 637, 641–648, 675, 676, 361/677, 624, 626, 631, 679.01, 679.54, 361/704–713; 174/16.2, 50.02, 68.2, 68.3, 174/70 B, 71 B, 72 B, 88 B, 99 B, 133 B; 29/592.1; 165/80.3, 104.33, 185
See application file for complete search history.

(56) References Cited

U.S. PATENT DOCUMENTS 3,721,890 A * 3/1973 Ettinger et al. ............... 363/144
3,728,585 A * 4/1973 Olashaw ....................... 361/677
3,840,785 A * 10/1974 Olashaw ....................... 361/614

(Continued)

FOREIGN PATENT DOCUMENTS

DE 102007023980 9/2008
EP 0 576 457 4/1996

*Primary Examiner* — Michail V Datskovskiy
(74) *Attorney, Agent, or Firm* — Renner Kenner Greive Bobak Taylor & Weber

(57) ABSTRACT

The subject of the invention is an electric power switchgear, an insulating radiator, and a method for installing the radiator in an electric power switchgear, and in particular in a medium or high voltage switchgear. The electric power switchgear comprising working elements placed in the housing and connected with busbars and branches, and cooled with air, is characterized in that it contains at least one insulating radiator made of thermoplastic material of increased thermal conductivity $\lambda \geq 2$ W/mK, which is placed in the electric field of the switchgear and which is connected by a non-permanent fastening to at least one busbar or/and at least one branch. The insulating radiator designed for the switchgear is an injection molding including a base plate to whose top face a system of heat evacuating elements of identical or diverse shape is attached, and to its side surfaces elastic assembly catches are fixed.

15 Claims, 5 Drawing Sheets

U.S. PATENT DOCUMENTS

| | | | |
|---|---|---|---|
| 5,166,861 A * | 11/1992 | Krom | 361/678 |
| 6,018,455 A * | 1/2000 | Wilkie et al. | 361/676 |
| 6,093,961 A * | 7/2000 | McCullough | 257/718 |
| 6,510,047 B2 * | 1/2003 | Meiners et al. | 361/676 |
| 6,574,094 B1 * | 6/2003 | Morrow et al. | 361/676 |
| 8,134,070 B2 * | 3/2012 | Hirschfeld | 174/72 B |
| 8,169,775 B2 * | 5/2012 | Bortoli et al. | 361/677 |
| 8,270,167 B2 * | 9/2012 | Greenwood et al. | 361/704 |
| 8,339,772 B2 * | 12/2012 | Peralta et al. | 361/676 |
| 2005/0063154 A1 | 3/2005 | Pleines et al. | 361/690 |

* cited by examiner

A-A

A-A

POWER SWITCHGEAR

CROSS-REFERENCE TO RELATED APPLICATION

This is a §371 application of International patent application number PCT/EP2010/004402 filed Jul. 8, 2010, which claims priority of European patent application number 09460033.5 filed Jul. 27, 2009, both of which are incorporated herein by reference.

TECHNICAL FIELD

The subject of the invention is a power switchgear, an insulating radiator, and a method of fitting the radiator in the power switchgear, and especially in a medium or high voltage switchgear.

BACKGROUND ART

In high voltage equipment, due to high currents, overheating of elements of the current path takes place, which adversely affects the thermal conditions in the switchgear. In order to improve heat evacuation from inside the switchgear and lower the temperature, a special window is made in its casing to force air circulation to provide the ventilation of the switchgear.

A method and a device for separating cooling air in the switchgear cubicle are known from patent description EP0576457. The device comprises compartments connected in series, located close to one another and closed for ambient air, in which the current path of equipment and channels for separating air or other cooling gas are situated. The direction of flow of cooling gas is the same or opposite to the direction of flow of current.

Metal radiators mounted outside the switchgear in order to reduce the temperature of equipment housed in the switchgear cubicle are commonly known. These radiators are usually made of aluminium. For example, a known design implemented in ZX2 type of medium voltage gas insulated switchgears made by ABB is a system of aluminium radiators outside the switchgear housing. This design allows to reduce the temperature of gas inside equipment, in particular the temperature of air in the busbar compartment. Indirectly, this allows also to reduce the temperature of the current path elements, but the efficiency of such design is limited. Direct installation of radiators on busbars or on other elements of the current path of the switchgear would allow to considerably improve heat evacuation and reduce the temperature of these elements. However, due to the fact that radiators are made of electrically conductive materials, such as aluminium or copper, they cannot be placed directly on the busbars. Their presence will result in the reduction of insulation gaps in the switchgear and will cause disturbance and unfavourable distribution of the electric field, which may lead to short circuits and destruction of the switchgear.

SUMMARY OF THE INVENTION

The essential feature of the electric power switchgear according to the invention, comprising working elements placed in the housing and connected with busbars and branches, which is cooled with air supplied from outside in a natural or forced way is that the switchgear contains at least one insulating radiator made of thermoplastic material of increased thermal conductivity of $\lambda \geqq 2$ W/mK, which is placed in the electric field of the switchgear and which is directly connected by a non-permanent fastening to at least one busbar or/and at least one branch.

In the switchgear, the insulating radiator is connected with the busbar or branch by means of elastic assembly catches.

The insulating radiator is situated on the busbar or branch near "hot-spots".

The "hot-spots" are determined by computer simulation.

Alternatively, "hot-spots" are determined by infrared mapping.

The essential feature of the insulating radiator designed for the inventive switchgear is that the radiator is an injection moulding containing a base plate to which upper face a system of heat-evacuating elements of the same or diverse shape is attached and on whose side surfaces elastic assembly catches are attached.

The elastic assembly catches suit the thickness of an individual busbar or branch.

The heat-evacuating elements have the shape of a truncated cone. As an alternative, the heat-evacuating elements have the shape of a truncated pyramid.

Alternatively, the heat-evacuating elements have a dendritic shape.

The heat-evacuating elements have the shape of ribs.

The method of installation of the inventive radiator in an electric power switchgear is such that the radiator is clamped directly on the busbar or branch by means of elastic assembly catches, or before clamping the insulating radiator on the busbar or branch, an elastic pad made of thermally conductive material is placed between the bottom face of the base plate and the outer surface of the busbar or branch.

The pad is a layer of paste of increased thermal conductivity.

Alternatively, the pad is a silicone tape of increased thermal conductivity.

Alternatively, the elastic pad is integrated with the radiator and it is made of thermoplastic elastomer in one production cycle of the radiator production.

The advantage of the invention is the possibility of placing the radiators anywhere on the current path elements, since they are made of an electrically insulating material and therefore do not disturb the distribution of the electric field inside the switchgear. Insulating radiators made by the injection moulding process can have a complicated shape, which allows to increase the surface for convection and radiation heat exchange and for efficient evacuation of heat from the adjacent elements. Production of metal radiators with similarly complex geometry is much more difficult and requires much more expensive technologies than the injection moulding process. An additional advantage of thermoplastic materials is their bigger elasticity facilitating the installation of radiators made of such materials. Owing to the use of snap-fit elastic catches a quick assembly and disassembly of radiators is possible, without the need for additional elements such as screws, which are necessary for metal radiators.

BRIEF DESCRIPTION OF THE DRAWINGS

The invention is presented as an embodiment in drawings where.

BEST MODE FOR CARRYING OUT THE INVENTION

Figure 1:
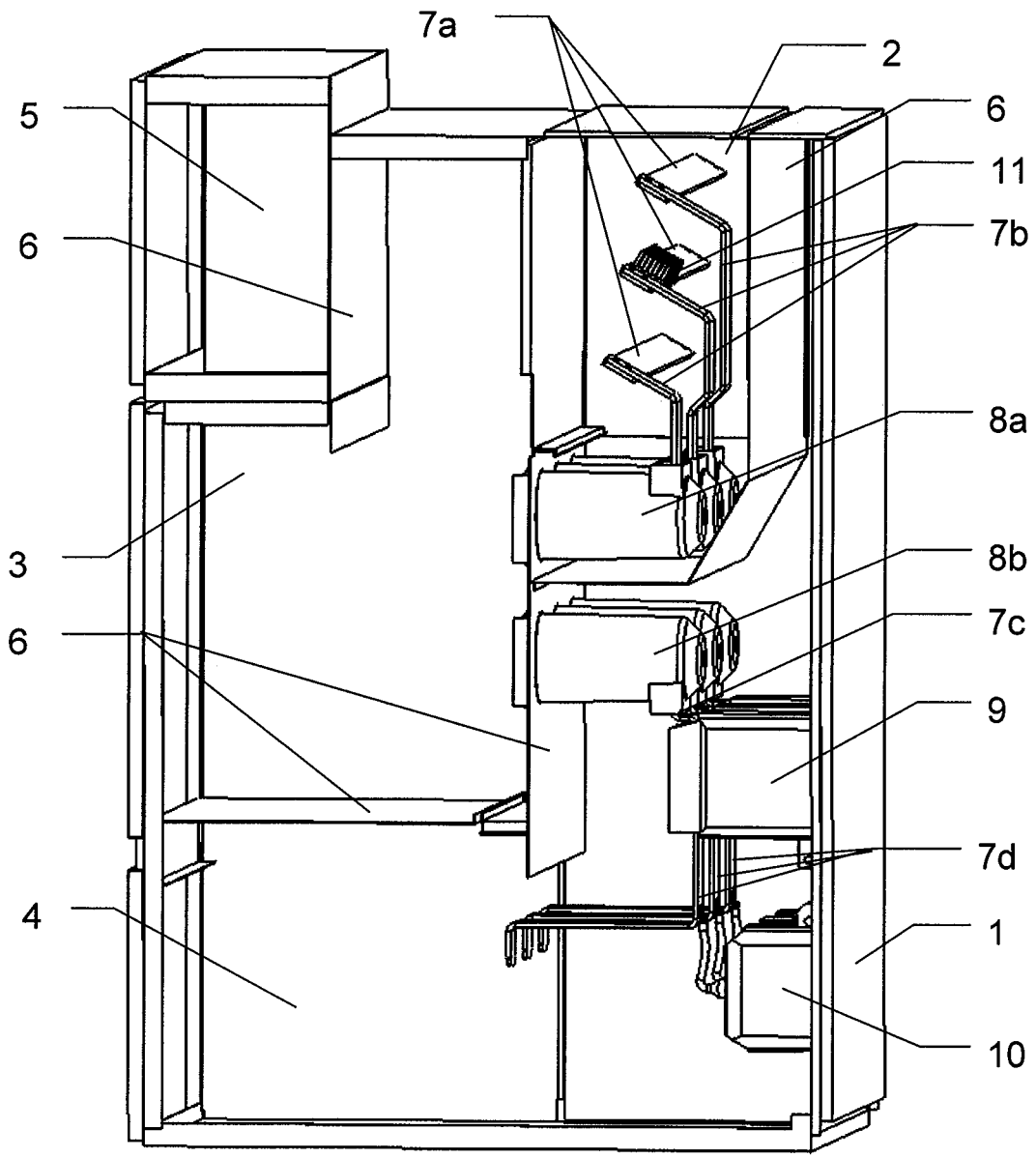
FIG. 1 shows a diagram of the switchgear casing including the layout of the busbars and branches, as a side section, in an isometric projection, after detaching the outer wall of the switchgear.
Figure 2:
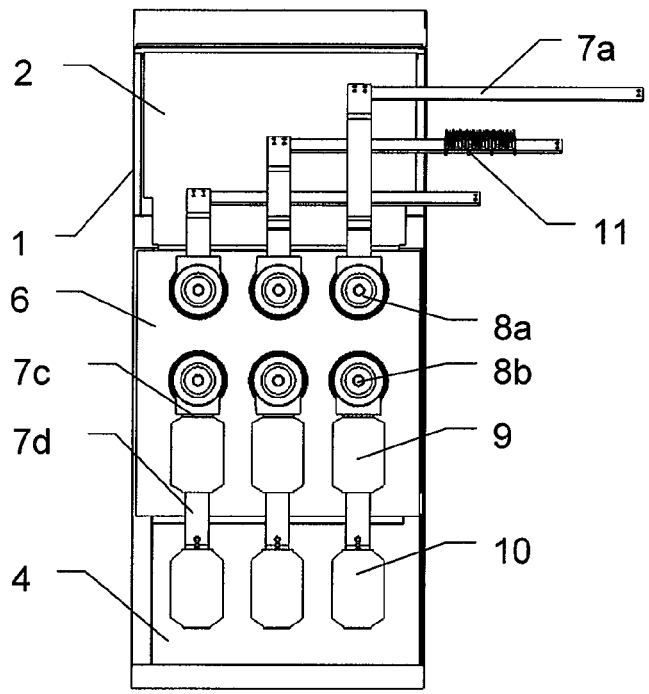
FIG. 2 shows a schematic view of the switchgear casing including the layout of the busbars and branches, after detaching the outer wall of the switchgear and the busbar compartment segregation wall, with an insulating radiator installed on a busbar.
Figure 3:
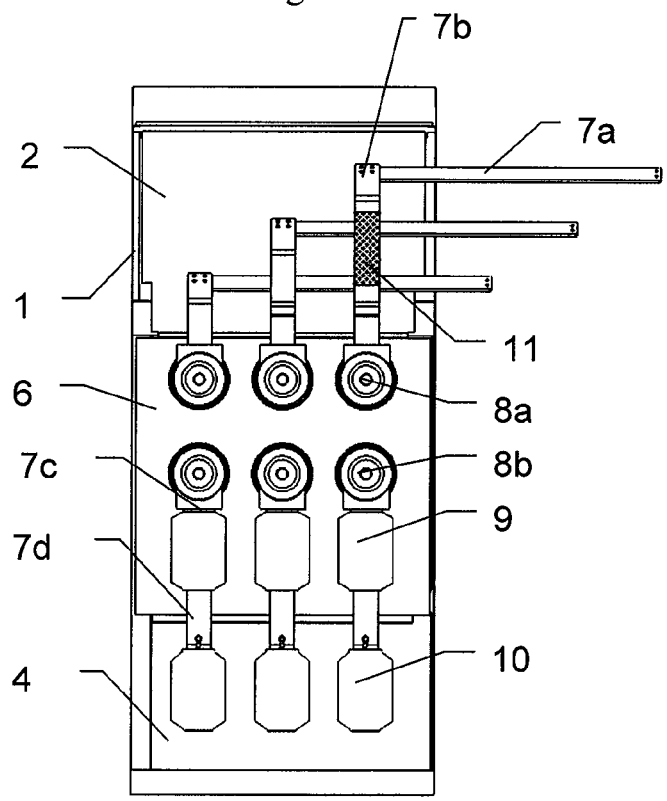
FIG. 3 shows a schematic view of the switchgear casing including the layout of the busbars, after detaching the outer wall of the switchgear and the busbar compartment segregation wall, with an insulating radiator installed on a branch.
Figure 4:
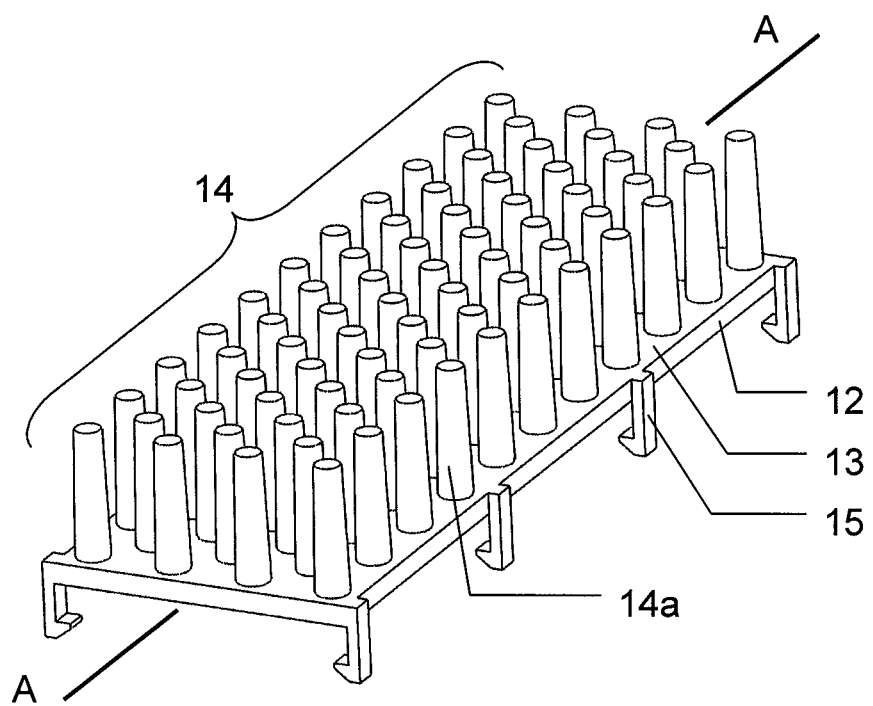
FIG. 4 shows a view of the insulating radiator in an isometric projection in the first embodiment of the invention.
Figure 5:
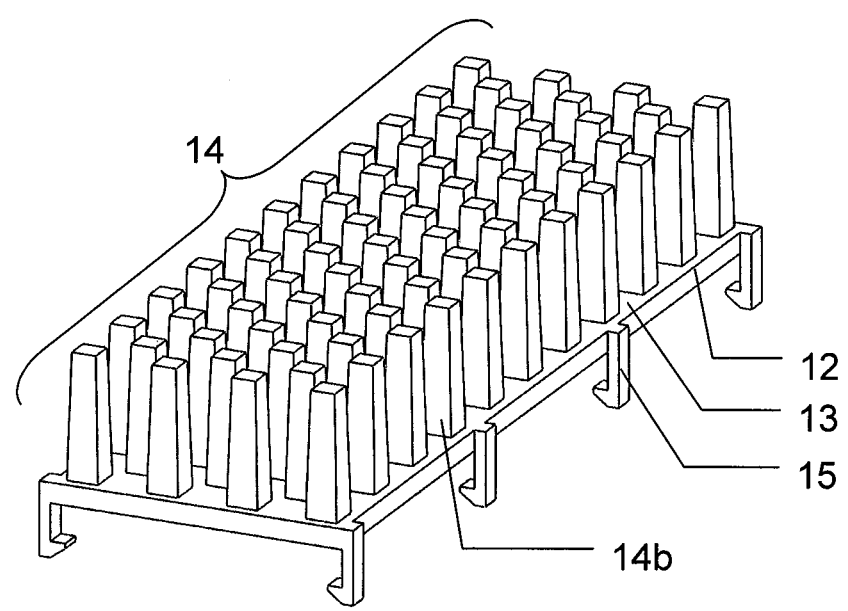
FIG. 5 shows a view of the insulating radiator in an isometric projection in the second embodiment of the invention.
Figure 6:
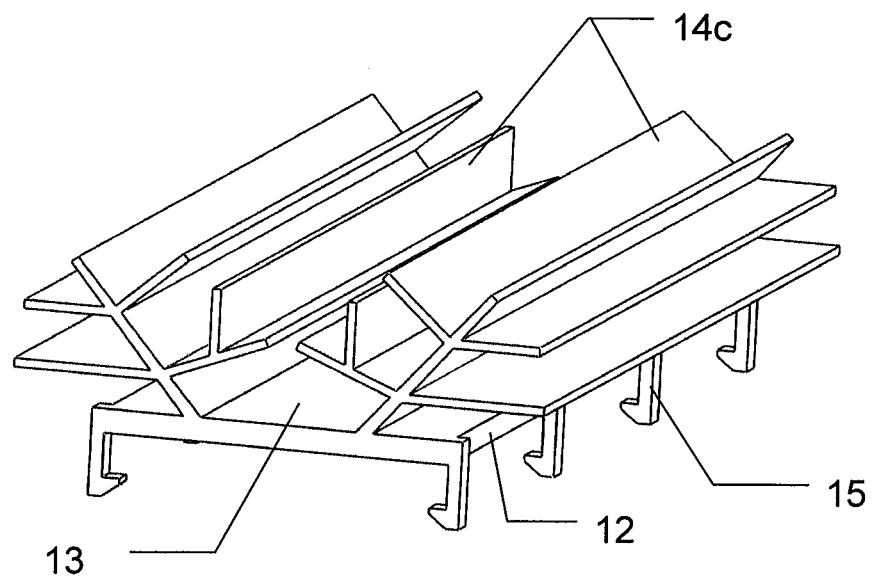
FIG. 6 shows a view of the insulating radiator in an isometric projection in the third embodiment of the invention.
Figure 7:
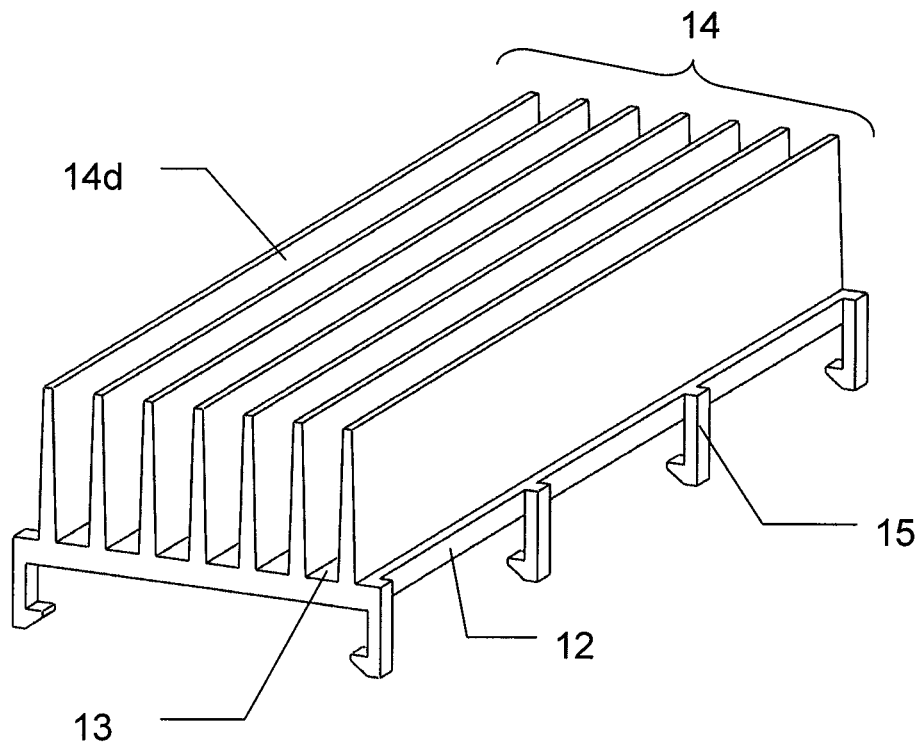
FIG. 7 shows a view of the insulating radiator in an isometric projection in the fourth embodiment of the invention.
Figure 8:
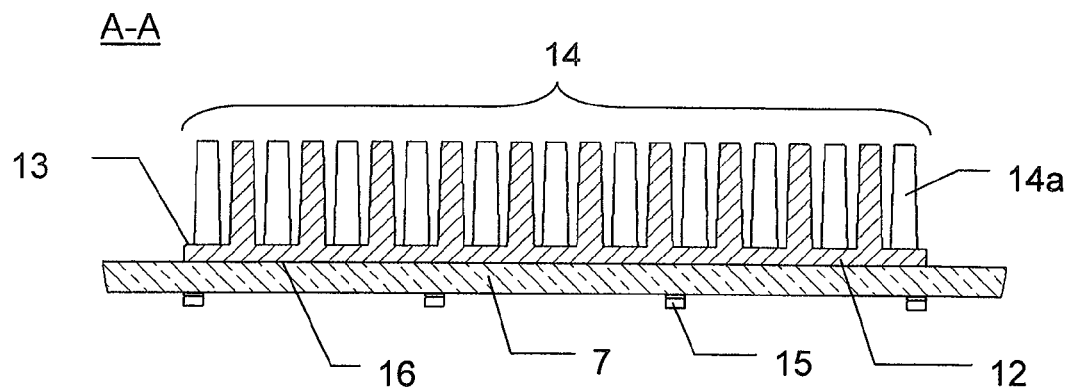
FIG. 8 shows the insulating radiator connected with a busbar, where the radiator adheres to the busbar directly, as a side section.
Figure 9:
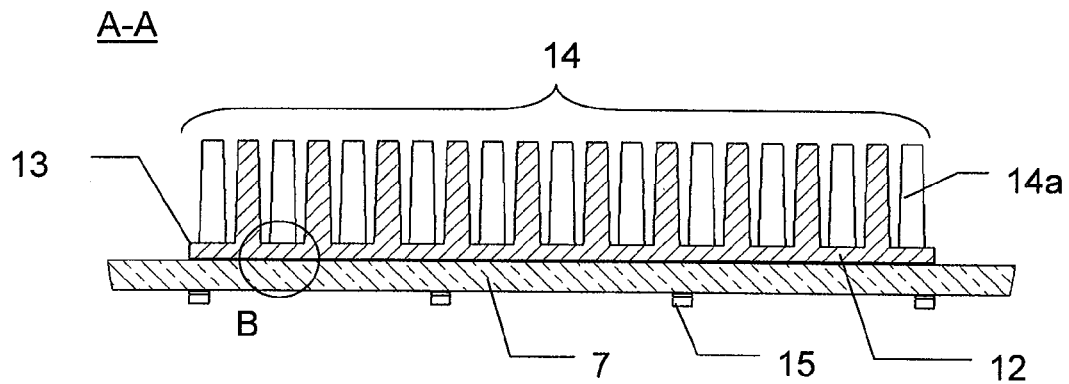
FIG. 9 shows the insulating radiator connected with a busbar, with a pad between the radiator and the busbar, as a side section.
Figure 10:
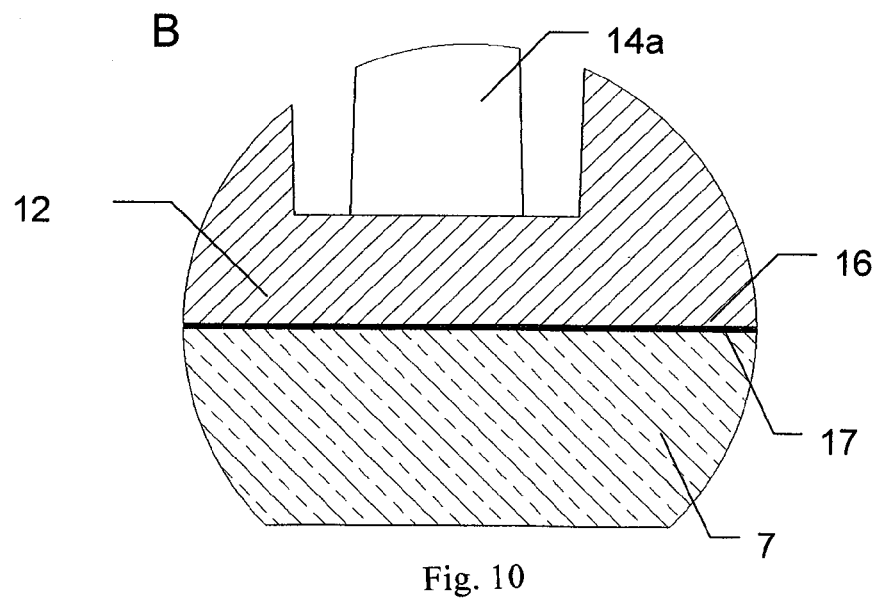
FIG. 10 shows the detail B from the FIG. 9.

The switchgear whose diagram is shown in FIG. 1 has a steel casing 1 comprising four main compartments: a busbar compartment 2, a circuit-breaker compartment 3, a feeder compartment 4, and a low voltage compartment 5. Individual compartments are divided from one another by steel segregation walls 6. In the busbar compartment 2, busbars 7a are connected on one end with the output of a circuit breaker, not shown in the drawing, which is placed in the circuit-breaker compartment 3, through branches 7b and resin components so called "busbar side chambers" 8a, while their other end is a connection with the analogous busbar compartment of the neighbouring switchgear cabinet, not shown in the drawing. In the feeder compartment 4 the circuit breaker from the circuit-breaker compartment 3, through so called "cable side chambers" 8b, branches 7c and 7d is connected with current transformers 9, voltage transformers 10 and cable connections not shown in the drawing. Insulating radiator 11 is installed on busbar 7a. FIG. 2 exemplifies the installation of the radiator 11 on a busbar 7a, and FIG. 3 exemplifies the installation of the radiator 11 on a branch 7b.

The insulating radiator 11 is made of thermoplastic material characterised by high thermal conductivity ($\lambda \geq 2$ W/mK), and it is an injection moulding made in one production cycle as one integrated whole. The radiator 11 is comprised of an elongated base plate 12 to whose top face 13 a heat-evacuating elements 14 are attached. In the first embodiment of the radiator, the heat evacuating elements have the shape of stakes in the form of truncated cones 14a. In the second embodiment of the invention, the heat evacuating elements have the shape of truncated pyramids 14b of any base. In the third embodiment of the invention, the heat evacuating elements have the shape of dendritic stakes 14c. In the fourth embodiment of the invention, the heat evacuating elements have the shape of ribs 14d, preferably situated parallel to one another. The individual heat evacuating elements 14 can have the same height or their height can be different, which is not shown in the drawing. On side surfaces of the plate 12 there are situated elastic assembly catches 15 of the snap-fit type, which suit the thickness of individual busbars 7a or branch 7b, 7c, 7d of the switchgear and which are made as integral parts with the base plate 12. These catches 15 clamp the side surfaces of the busbar 7a or branch 7b, 7c, 7d.

The system of heat evacuating elements 14 fixed to the top face 13 of the radiator 11 plate forms a developed surface, and mainly through this surface exchange of heat with air flowing around takes place.

The way of fixing the radiators 11 on the surfaces of busbars 7a or branches 7b, 7c, 7d is very simple, because it consists in putting the radiators directly on the bus or busses and clamping the radiators on the bus by means of elastic assembly catches 15. The installation of the radiators by means of additional band clips or clamps made of insulating material is also allowed. Before installing the radiators 11 on busbars 7a or branch 7b, 7c, 7d, it is necessary to determine places with the highest temperatures called hot-spots. They can be determined preferably by two methods: the numeric simulation of the heat-exchange and fluid-flow phenomena, and/or the infrared mapping. By the numeric simulation method the whole switchgear or a selected part of it can be modelled. After preparing the numeric model of the analysed device, and after defining the material data, as well as the boundary and initial conditions, the distribution of temperature inside the switchgear is calculated. In this method it is not necessary to start the switchgear. The infrared mapping method requires starting the switchgear; then the temperature distribution on the busbars is monitored by means of an infrared camera. In both methods, on the basis of the received temperature distributions inside the switchgear, the place of installation of the radiators 11 is determined as a place situated as closely as possible to the places of the highest determined or measured temperature. Elastic snap-fit assembly catches 15 integrated with the radiators 11 are used for the installation of the radiators 11 on busbars 7a or branches 7b, 7c, 7d. The installation of radiators 11 is accomplished by pressing them to the surface of the busbar 7a or branch 7b, 7c, 7d in predetermined places. Direct installation on the surface of the busbar 7a or branch 7b, 7c, 7d is possible due to the fact that both the busbar or branch and the surface of the radiator base are characterised by a flat shape and low roughness. In another embodiment of the invention, during the installation of the radiator on the busbar 7a or branch 7b, 7c, 7d, between the bottom surface 16 of the radiator 11 base and the busbar 7a or branch 7b, 7c, 7d, an elastic pad 17 is used in the form of a thin layer of paste of increased thermal conductivity, or silicone tape, also of increased thermal conductivity. The elastic pad 17 can be integrated with the radiator and made of TPE (thermoplastic elastomer) in one production cycle of the radiator 11 production. In this case the radiator 11 together with the pad 17 can be produced by two-component injection in the so called 2K moulding method.

The invention claimed is:

1. An electric power switchgear comprising working elements placed in a casing which are connected with busbars and branches, cooled with air supplied from outside in a natural or forced way, characterised in that it contains at least one insulating radiator made of thermoplastic material of increased thermal conductivity $\lambda \geq 2$ W/mK, which is placed in the electric field of the switchgear and is directly connected by a non-permanent fastening with at least one busbar or/and at least one branch.

2. The switchgear according to claim 1, characterised in that the insulating radiator is connected with the busbar or branch by means of elastic assembly catches.

3. The switchgear according to claim 2, characterised in that the insulating radiator is situated on the busbar or branch near places determined as hot-spots.

4. The switchgear according to claim 3 characterised in that the places defined as hot-spots are found using a computer simulation method.

5. The switchgear according to claim 3 characterised in that the places defined as hot-spots are found using the infrared mapping method.

6. An insulating radiator designed for the switchgear according to claim 1, characterised in that it is an injection moulding containing a base plate, to whose top face a system of heat-evacuating elements of the same or diverse shape is attached and on whose side surfaces the elastic assembly catches are attached.

7. The radiator according to claim 6, characterised in that the elastic assembly catches suit the thickness of an individual busbar or branch.

8. The radiator according to claim 6, characterised in that the heat evacuating elements have the shape of truncated cones.

9. The radiator according to claim 6, characterised in that the heat evacuating elements have the shape of truncated pyramids.

10. The radiator according to claim 6, characterised in that the heat evacuating elements have a dendritic shape.

11. The radiator according to claim 6, characterised in that the heat evacuating elements have the shape of ribs.

12. A method of installation of the radiators in an electric power switchgear, comprising: clamping an insulating radiator directly on either a busbar or branch by means of elastic assembly catches, or including an elastic pad made of thermally conducting material between a bottom face of the insulating radiator and an outer surface of the busbar or branch.

13. The method according to claim 12, characterised in that the pad is a layer of paste of increased thermal conductivity.

14. The method according to claim 12, characterised in that the pad is a silicone tape of increased thermal conductivity.

15. The method according to claim 12, characterised in that the elastic pad is integrated with the radiator and is made of thermoplastic elastomer in one production cycle of the radiator manufacturing.

* * * * *